United States Patent
Teshima et al.

(10) Patent No.: US 9,109,728 B2
(45) Date of Patent: *Aug. 18, 2015

(54) RESINOUS PIPE JOINT

(75) Inventors: Kazukiyo Teshima, Sanda (JP); Akihiro Masuda, Sanda (JP); Takehiro Nakamura, Sanda (JP); Masateru Yamada, Sanda (JP); Takayuki Kishimoto, Sanda (JP); Toshiyuki Fukumoto, Sanda (JP); Ryo Imanishi, Sanda (JP)

(73) Assignee: NIPPON PILLAR PACKAGING CO., LTD., Osaka-Shi (JP)

( * ) Notice: Subject to any disclaimer, the term of this patent is extended or adjusted under 35 U.S.C. 154(b) by 521 days.

This patent is subject to a terminal disclaimer.

(21) Appl. No.: 13/057,229

(22) PCT Filed: Jul. 14, 2009

(86) PCT No.: PCT/JP2009/062747
§ 371 (c)(1),
(2), (4) Date: Apr. 29, 2011

(87) PCT Pub. No.: WO2010/016363
PCT Pub. Date: Feb. 11, 2010

(65) Prior Publication Data
US 2011/0221190 A1  Sep. 15, 2011

(30) Foreign Application Priority Data

Aug. 5, 2008  (JP) ................................ 2008-202362
Aug. 5, 2008  (JP) ................................ 2008-202363

(51) Int. Cl.
*F16L 19/08* (2006.01)
*F16L 19/028* (2006.01)
(Continued)

(52) U.S. Cl.
CPC ........... *F16L 19/0283* (2013.01); *F16L 19/041* (2013.01); *F16L 47/04* (2013.01)

(58) Field of Classification Search
CPC ... F16L 19/08; F16L 19/0283; F16L 19/0286; F16L 33/223; F16L 47/04; F16L 19/041
USPC ............... 285/246, 247, 250, 259, 334.5, 386
See application file for complete search history.

(56) References Cited

U.S. PATENT DOCUMENTS

| | | | |
|---|---|---|---|
| 5,472,244 A | 12/1995 | Nishikata et al. | |
| 6,022,053 A * | 2/2000 | Hukuda | 285/331 |
| 6,543,815 B2 * | 4/2003 | Suzuki | 285/331 |

(Continued)

FOREIGN PATENT DOCUMENTS

| | | | | |
|---|---|---|---|---|
| EP | 425022 A1 * | 5/1991 | | F16L 33/22 |
| JP | 54-065327 | 11/1980 | | |

(Continued)

*Primary Examiner* — James Hewitt
(74) *Attorney, Agent, or Firm* — Rankin, Hill & Clark LLP

(57) ABSTRACT

A resin pipe joint has: a synthetic resin-made joint body including an inner cylinder portion and an external thread portion; and a synthetic resin-made union nut including: an internal thread portion; a seal peripheral edge which is actable on a tip-end portion of a tube flared portion; a slipping-off prevention peripheral edge which is actable on a large-diameter portion of the flaring changing region; and a pressing inner peripheral portion which is externally fittable to a flared straight portion that is fitted to a straight barrel cylinder portion.

20 Claims, 4 Drawing Sheets

(51) Int. Cl.
*F16L 19/04* (2006.01)
*F16L 47/04* (2006.01)

(56) References Cited

U.S. PATENT DOCUMENTS

| | | | |
|---|---|---|---|
| 6,776,440 B2 * | 8/2004 | Nishio | 285/331 |
| 2003/0085569 A1 | 5/2003 | Nishio | |
| 2004/0100097 A1 * | 5/2004 | Fukano et al. | 285/322 |
| 2006/0157975 A1 * | 7/2006 | Fujii et al. | 285/247 |

FOREIGN PATENT DOCUMENTS

| | | | | |
|---|---|---|---|---|
| JP | 7-27274 | 1/1995 | | |
| JP | 7-12692 | 3/1995 | | |
| JP | 3041899 | 7/1997 | | |
| JP | 2587449 | 10/1998 | | |
| JP | 10318475 A | * 12/1998 | | F16L 33/22 |
| JP | 2002-317886 | 10/2002 | | |
| JP | 2002-357294 | 12/2002 | | |

* cited by examiner

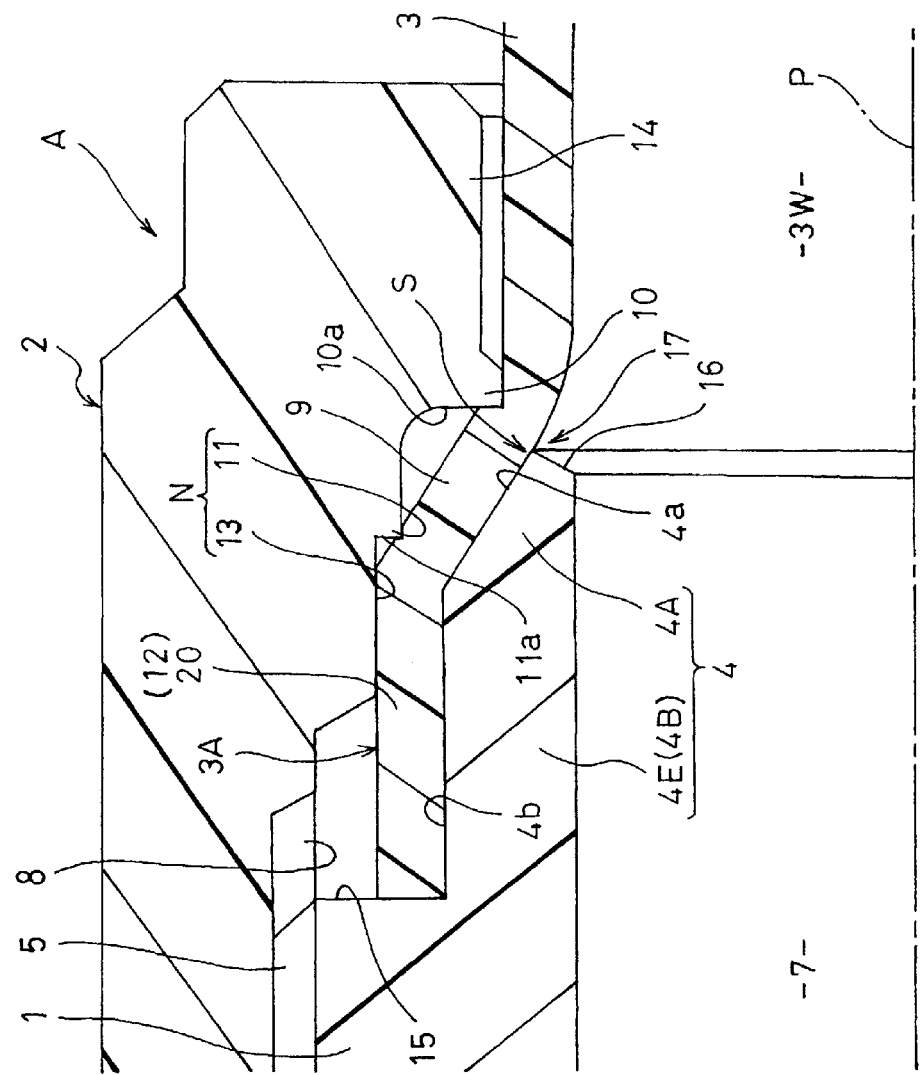

RESINOUS PIPE JOINT

TECHNICAL FIELD

The present invention relates to a tube joint consisting of resin, i.e., a resin pipe joint having a structure to which a tube functioning as a fluid transfer path is connected while flaring the tube, and more particularly to a resin pipe joint which is preferred also in piping for a liquid having high purity or ultrapure water to be handled in a production process of various technical fields such as production of semiconductor devices, production of medical equipment and medicines, food processing, and chemical industry, and which is used as means for connecting a fluid apparatus such as a pump, a valve, or a filter, or a tube that is a fluid transfer path.

BACKGROUND ART

As a resin pipe joint of this kind, a tube joint disclosed in Patent Literature 1 is known. Namely, the tube joint is structured in the following manner. A synthetic resin-made tube 1 is forcedly pressed onto an inner cylinder portion 5 of a joint body 4, or, as shown in FIG. 2 of Patent Literature 1, a tube end portion 2 is previously flared and then fitted to the inner cylinder portion 5. Then, a union nut 6 which is previously fitted to the tube is screwed with the joint body, and forcedly moved in the axial direction of the joint body 4 by performing a fastening operation, whereby a flaring base portion 2a of the tube 1 is strongly pressed in the axial direction by an edge portion 6a to seal between the tube 1 and the inner cylinder portion 5.

As a structure similar to the above-described structure, a structure disclosed in FIGS. 8 and 9 of Patent Literature 2, and a resin pipe joint disclosed in FIG. 6 of Patent Literature 3 are known. As shown in these figures, a joint structure in which the tip end of a tube is flared, externally fitted to a joint body, and fastened by a nut has an advantage that a good sealing function is obtained although a pipe joint is economically configured by a small number (two) of components, i.e., the joint body and a union nut, as compared with a structure disclosed in FIG. 5 of Patent Literature 2, FIG. 5 of Patent Literature 3, and the like, i.e., a pipe joint having a three-component structure in which an end of a tube that is flared and externally fitted to an inner ring that is a dedicated component is fitted into a tubular receiving port of a joint body, and fastened by a union nut.

In a conventional resin pipe joint which is configured by two components as described above, however, an end of a tube is flared and firmly fitted, and a flaring base portion is fastened by a union nut, and, probably because the fastening is performed in order to attain a sealing function, there is a tendency that the joint is relatively weak against a force of pulling the tube out of a joint body. A pulling movement itself of a tube is problematic. There is a further problem in that this movement causes also a seal point due to the pressing by an edge portion to be shifted, and the sealing property is adversely influenced. In the case where, in order to handle a high-temperature fluid of 100° C. or higher, a resin pipe joint is formed by a resin material having a large coefficient of expansion such as a fluorine resin, particularly, these problems become more noticeable.

As disclosed in Patent Literature 4, therefore, it is known that a resin pipe joint which exerts not only a sealing function but also a resistance against pulling of a tube is obtained by disposing pulling resistant means having a structure in which a C-like split ring is interposed between a flared portion of the tube and a union nut in a state where the ring is fitted into a peripheral groove of the tube flared portion. In the resin pipe joint disclosed in Patent Literature 4, however, preprocessing of previously forming the peripheral groove in the tube flared portion is necessary, and the number of components is increased to three. Therefore, there arises a new problem in that the economical advantage which is originally provided in such a resin pipe joint is impaired.

In order that a resin pipe joint configured by two components or a joint body and a union nut is formed so as to have a high resistance against pulling without causing the new problem, consequently, there remains room for further improvement.

PRIOR ART LITERATURE

Patent Literature

Patent Literature 1: Japanese Utility Model Registration No. 3,041,899
Patent Literature 2: Japanese Patent Application Laid-Open No. 7-27274
Patent Literature 3: Japanese Patent. Application Laid-Open No. 2002-357294
Patent Literature 4: Japanese Utility Model Registration No. 2,587,449

SUMMARY OF THE INVENTION

Problem to be Solved by the Invention

In view of the above-discussed circumstances, it is an object of the invention to provide a resin pipe joint in which, although an economical configuration formed by two components or a joint body and a union nut is employed, both a resistance against pulling and an excellent sealing property can be attained.

Means for Solving the Problem

In one embodiment, the invention is characterized in that a resin pipe joint has: a synthetic resin-made joint body 1 including an inner cylinder portion 4 to which an end portion of a synthetic resin-made tube 3 is externally fittable and attachable while being flared, and an external thread portion 5; and a synthetic resin-made union nut 2 including: an internal thread portion 8 which is screwable with the external thread portion 5; a seal pressing portion 10 which is actable on a small-diameter portion of a flaring changing region 9 in a flared portion 3A of the tube 3, the flared portion being externally fitted to the inner cylinder portion 4; a slipping-off prevention pressing portion 11 which is actable on a large-diameter portion of the flaring changing region 9; and a pressing inner peripheral portion 13 which is externally fittable to a flared straight portion 12 of the flared portion 3A, the flared straight portion surrounding a constant-diameter straight barrel cylinder portion 4B, and the resin pipe joint is set so that, by a screw advancement of the union nut 2 in a direction of an axis P of the joint body 1, the screw advancement being caused by screwing the internal thread portion 8 to the external thread portion 5 in a state where an end of the tube 3 is externally fitted and attached to the inner cylinder portion 4 and the flared portion 3A is formed, the pressing inner peripheral portion 13 is externally fitted to the flared straight portion 12, a portion of the large-diameter portion of the flaring changing region 9 is pressed in the direction of the axis P by the slipping-off prevention pressing portion 11, a diameter of the portion being larger than a diameter of the inner cylinder portion 4, and the small-diameter portion of the flaring changing region 9 is pressed in the direction of the axis P by the seal pressing portion 10.

In one embodiment, the invention is characterized in that a resin pipe joint has: a synthetic resin-made joint body 1 including an inner cylinder portion 4 to which an end portion of a synthetic resin-made tube 3 is externally fittable and attachable while being flared, and an external thread portion 5; and a synthetic resin-made union nut 2 including: an internal thread portion 8 which is screwable with the external thread portion 5; a seal pressing portion 10 which is actable on a small-diameter portion of a flaring changing region 9 in a flared portion 3A of the tube 3, the flared portion being externally fitted to the inner cylinder portion 4; a slipping-off prevention pressing portion 11 which is actable on a large-diameter portion of the flaring changing region 9; and a pressing inner peripheral portion 13 which is externally fittable to a flared straight portion 12 of the flared portion 3A, the flared straight portion surrounding a constant-diameter straight barrel cylinder portion 4B, and the resin pipe joint is set so that, by a screw advancement of the union nut 2 in a direction of an axis P of the joint body 1, the screw advancement being caused by screwing the internal thread portion 8 to the external thread portion 5 in a state where the tube 3 is externally fitted and attached to the inner cylinder portion 4 and the flared portion 3A is formed, the pressing inner peripheral portion 13 is pressingly contacted with and externally fitted to the flared straight portion 12, the large-diameter portion of the flaring changing region 9 is pressed in the direction of the axis P by the slipping-off prevention pressing portion 11, and the small-diameter portion of the flaring changing region 9 is pressed in the direction of the axis P by the seal pressing portion 10.

In one embodiment, the invention is characterized in that, in the resin pipe joint, the pressing inner peripheral portion 13 is pressingly contacted with and externally fitted to the flared straight portion 12 in a degree in which a radial gap is not formed between the pressing inner peripheral portion and the flared straight portion 12, and co-rotation of the flared portion 3A due to fastening of the union nut 2 does not occur.

In one embodiment, the invention is characterized in that, in the resin pipe joint, the inner cylinder portion 4 is formed by an end-tapered cylinder portion 4A which causes the tube 3 to be gradually flared, and the straight barrel cylinder portion 4B which is formed in succession to a large-diameter side of the end-tapered cylinder portion 4A, and the flaring changing region 9 of the tube 3 is a portion which is put over the end-tapered cylinder portion 4A.

In one embodiment, the invention is characterized in that, in the resin pipe joint, the straight barrel cylinder portion 4B is extended to an end of the inner cylinder portion 4, the end being opposite to the end-tapered cylinder portion 4A.

In one embodiment, the invention is characterized in that, in the resin pipe joint, the inner cylinder portion 4 has a small-diameter straight barrel cylinder portion 4C which is formed in a side of the straight barrel cylinder portion 4B in a state where a diameter is smaller than the straight barrel cylinder portion 4B, the side being opposite to the end-tapered cylinder portion 4A.

In one embodiment, the invention is characterized in that, in the resin pipe joint, both the joint body 1 and the union nut 2 are made of a fluorine resin.

In one embodiment, the invention is characterized in that, in the resin pipe joint, both the joint body 1 and the union nut 2 are made of a fluorine resin.

In one embodiment, the invention is characterized in that, in the resin pipe joint, both the joint body 1 and the union nut 2 are made of a fluorine resin.

In one embodiment, the invention is characterized in that, in the resin pipe joint, both the joint body 1 and the union nut 2 are made of a fluorine resin.

Effect of the Invention

According to one embodiment of the invention, sealing portion is formed in a tip end place of the inner cylinder portion, the tube and the joint body are satisfactorily sealed without causing the fluid to enter between the inner cylinder portion and the flared portion. The flared straight portion which is externally fitted to the inner cylinder portion is surrounded by the outer peripheral face of the straight barrel cylinder portion and the pressing inner peripheral portion, and held so as not to be expandingly deformed, and the slipping-off prevention pressing portion is positioned so as to substantially press the flared straight portion in the axial direction. Therefore, the synergy between the function in which the slipping-off prevention pressing portion directly strongly prevents the flared straight portion from performing a slipping off movement, and that in which radial expanding deformation of the flared straight portion due to a pulling force is suppressed produces a function of strongly regulating a movement of the flared portion in the axial direction and in a direction of slipping off from the inner cylinder portion. As a result, it is possible to provide a resin pipe joint in which, although an economical configuration formed by two components or a joint body and a union nut is employed, both a resistance against pulling and an excellent sealing property can be attained.

According to one embodiment of the invention, a sealing portion is formed in a tip end place of the inner cylinder portion, the tube and the joint body are satisfactorily sealed without causing the fluid to enter between the inner cylinder portion and the flared portion. The flared straight portion which is externally fitted to the inner cylinder portion is pressingly contacted with the outer peripheral face of the straight barrel cylinder portion and the pressing inner peripheral portion, and held so as not to be expandingly deformed, and the slipping-off prevention pressing portion is positioned so as to press the large-diameter portion of the flaring changing region in the axial direction. Therefore, the synergy between the function in which radial expanding deformation of the flared straight portion due to a pulling force is blocked, and that in which the slipping-off prevention pressing portion suppresses the flared straight portion from performing a slipping off movement produces a function of strongly regulating a movement of the flared portion in the axial direction and in a direction of slipping off from the inner cylinder portion. As a result, it is possible to provide a resin pipe joint in which, although an economical configuration formed by two components or a joint body and a union nut is employed, both a resistance against pulling and an excellent sealing property can be attained.

According to one embodiment of the invention, co-rotation of the flared portion due to fastening of the union nut does not occur, and, while preventing disadvantages such as a shift of a seal point and reduction of the resistance against pulling due to a rotation movement of the flared portion from occurring, the flared straight portion can be firmly interposed and fixed between the straight barrel cylinder portion and the pressing inner peripheral face. There is an advantage that further improvement of the resistance against pulling is enabled.

According to one embodiment of the invention, external fitting and attachment to the inner cylinder portion by flaring the tube with using the end-tapered cylinder portion are easily performed, and the place where the seal pressing portion acts on the flaring changing region, and that where the slipping-off prevention pressing portion acts on the flaring changing region are separated from each other in the axial direction. The sealing function and the slipping-off preventing function are easily clearly exerted.

According to one embodiment of the invention, the inner cylinder portion is formed into a straight pipe shape having a tapered tip end portion. Therefore, there is an advantage that mold shaping, cutting work, and the like are easily performed, and the productivity is excellent.

According to one embodiment of the invention, the inner cylinder portion is formed into an end-enlarged pipe shape having a tapered tip end portion and a base narrowed portion. Therefore, there is an advantage that the resistance against pulling of the tube is more excellent.

According to one embodiment of the invention, both the joint body and the union nut are made of a fluorine resin having excellent chemical resistance and heat resistance. Even when the fluid is a medical solution or a chemical solution, or the fluid is a high-temperature fluid, the joint structure portion is not deformed, and leakage does not easily occur. Therefore, the good sealing property and the resistance against pulling can be maintained. A fluorine resin is preferable because it is stable at a high temperature, and has high water repellency, a low coefficient of friction, a high chemical resistance, and a high electrical insulating property.

BRIEF DESCRIPTION OF THE DRAWINGS

FIG. 4 is an enlarged sectional view showing main portions of FIG. 3.

BEST MODE FOR CARRYING OUT THE INVENTION

Figure 1:
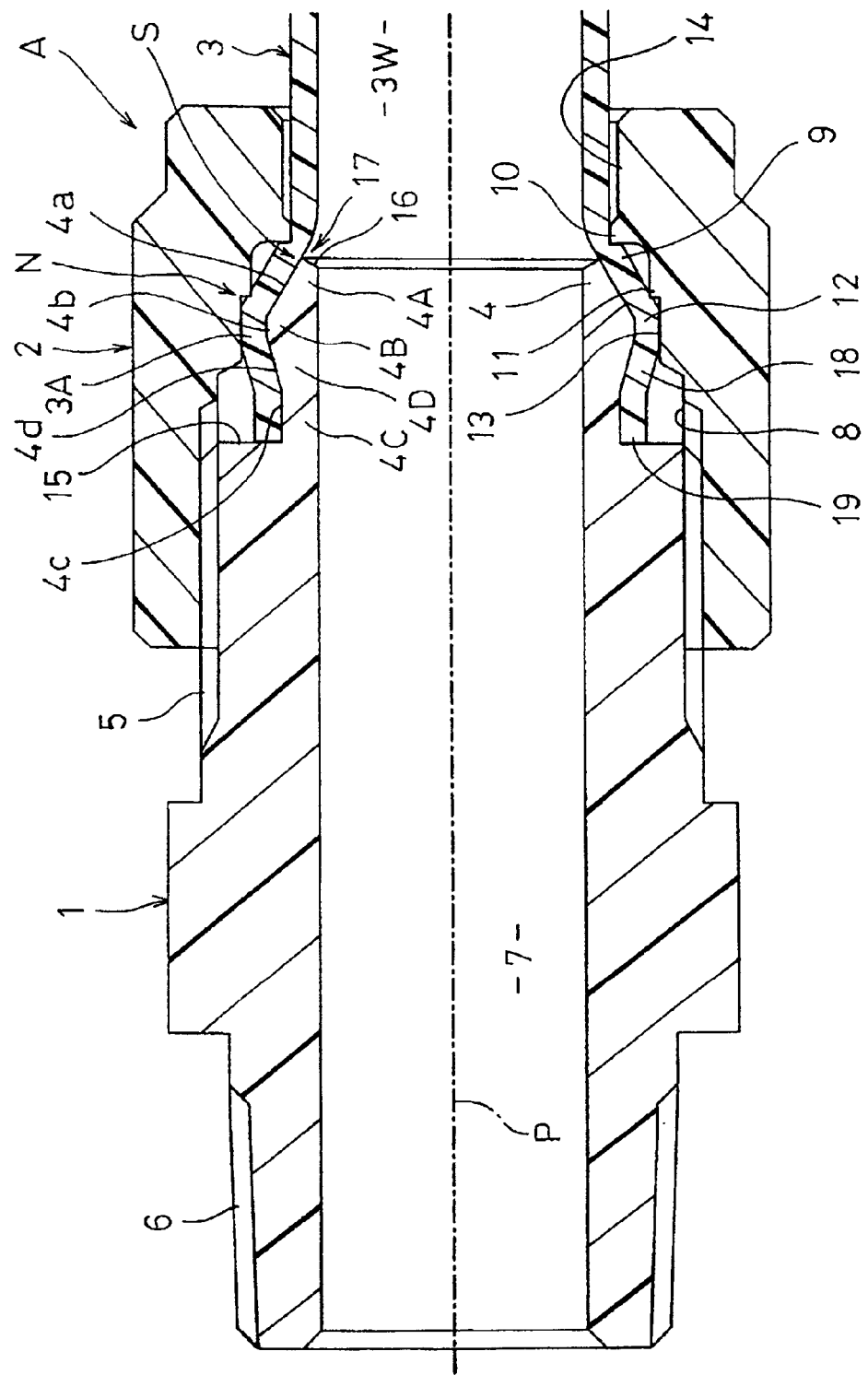
FIG. 1 is a sectional view showing the structure of a resin pipe joint of Embodiment 1.
Figure 2:
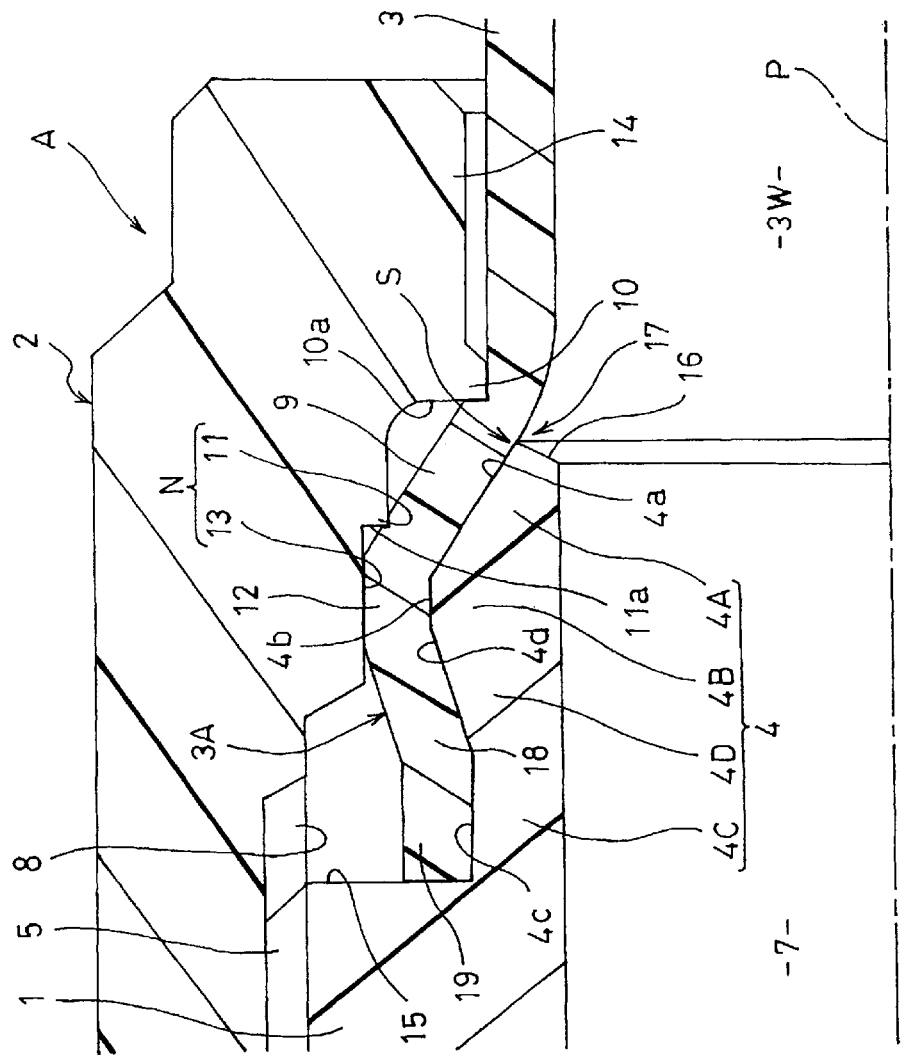
FIG. 2 is an enlarged sectional view showing main portions of FIG. 1.
Figure 3:
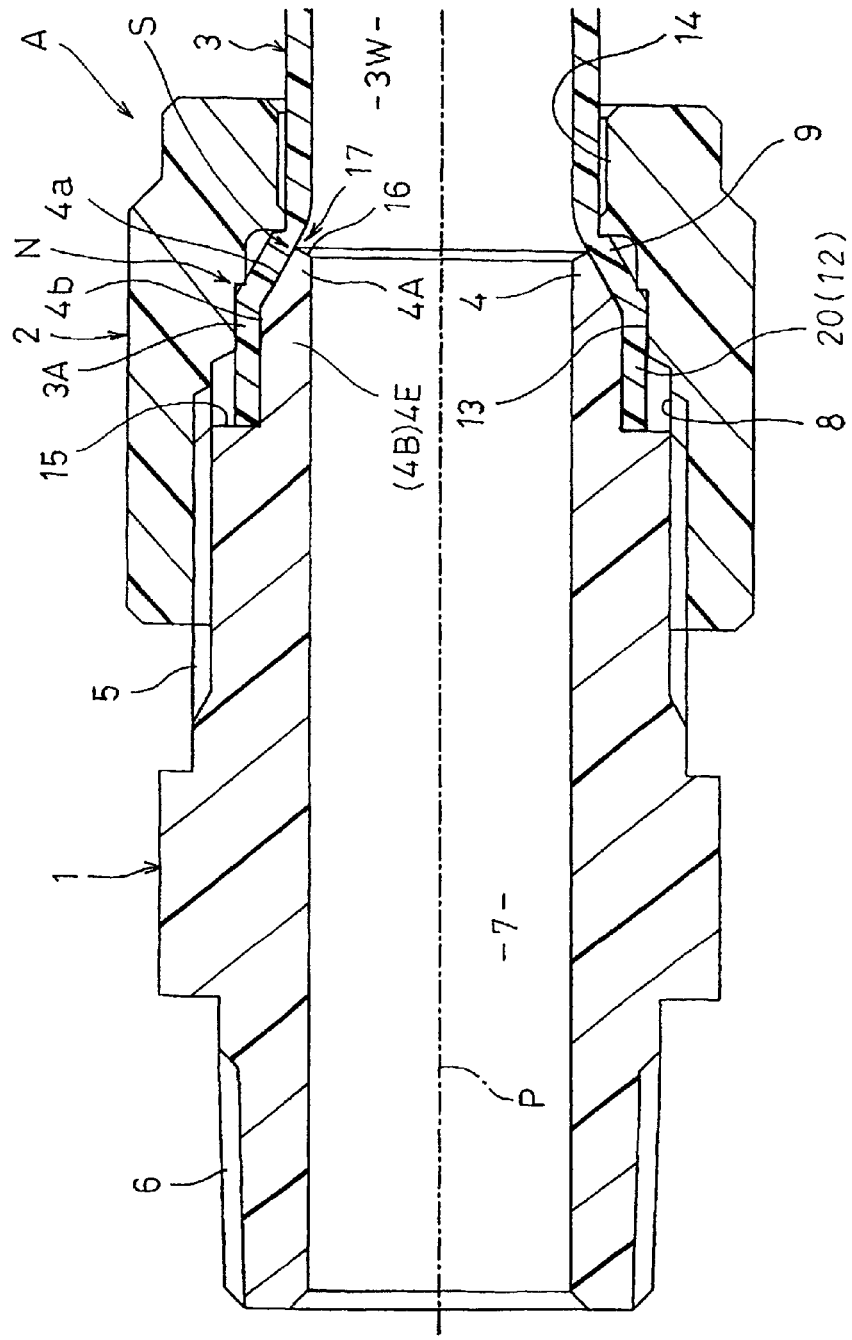
FIG. 3 is a sectional view showing the structure of a resin pipe joint of Embodiment 2.

Hereinafter, embodiments of the resin pipe joint of the invention will be described with reference to the drawings. FIGS. 1 and 2 are a sectional view and enlarged sectional view of main portions of a resin pipe joint of Embodiment 1, and FIGS. 3 and 4 are a sectional view and enlarged sectional view of main portions of a resin pipe joint of Embodiment 2.

[Embodiment 1]

As shown in FIGS. 1 and 2, a resin pipe joint A of Embodiment 1 communicatingly connects a tube 3 made of a fluorine resin (an example of a synthetic resin which is typified by PFA, PTFE, and the like) to a fluid apparatus such as a pump or a valve, or a tube of the same or different diameter, and is configured by two components or a joint body 1 made of a fluorine resin (an example of a synthetic resin which is typified by PFA, PTFE, and the like), and a union nut 2 made of a fluorine resin (an example of a synthetic resin which is typified by PFA, PTFE, and the like). The figures show an assembled state in which the union nut 2 is fastened by a predetermined degree.

As shown in FIGS. 1 and 2, the joint body 1 is formed into a cylindrical member including: an inner cylinder portion 4 to which an end portion of the tube 3 can be externally fitted and attached while flaring the end portion, and which is in one end; an external thread portion 5 which is continuously formed in a state where the diameter is larger than the inner cylinder portion 4, and which is on the outer periphery; a tapered external thread portion 6 which is in the other end; and a fluid path 7 which is a columnar space having the axis P. The inner cylinder portion 4 has: an end-tapered cylinder portion 4A which causes the tube 3 to be gradually flared; a straight barrel cylinder portion 4B which is formed in succession to a large-diameter side of the end-tapered cylinder portion 4A; a small-diameter straight barrel cylinder portion 4C which is formed in a side of the straight barrel cylinder portion 4B in a state where the diameter is smaller than the straight barrel cylinder portion 4B, the side being opposite to the end-tapered cylinder portion 4A; and an end-expanded cylinder portion 4D through which the straight barrel cylinder portion 4B and the small-diameter straight barrel cylinder portion 4C are connected to each other.

The diameter of the portion where the external thread portion 5 if formed is clearly larger than not only the small-diameter straight barrel cylinder portion 4C, but also the straight barrel cylinder portion 4B which has the maximum diameter in the inner cylinder portion 4. A side peripheral wall 15 which is perpendicular to the axis P is formed in a step portion which is the boundary between the external thread portion and the small-diameter straight barrel cylinder portion 4C. The tip end face of the inner cylinder portion 4 is formed by a reverse taper angle which, as advancing toward the radially inner side, is closer to the inner deeper side (the deeper side in the direction of the axis P). Namely, a cut face 16 in which the diameter is larger as further advancing toward the tip end is formed, and the shape of a liquid pool peripheral portion 17 formed by expandingly displacing the inner peripheral face of the tube 3 toward the flared portion is made to have an inner-peripheral side flared shape, so that the fluid hardly stagnates in the liquid pool peripheral portion 17. The cut face 16 is formed so that its maximum diameter has a substantially intermediate value between the inner and outer diameters of the tube 3 in a natural state. However, the value is not limited to this.

As shown in FIGS. 1 and 2, the union nut 2 includes: an internal thread portion 8 which is screwable with the external thread portion 5; a seal peripheral edge (an example of a seal pressing portion) 10 which is actable on a small-diameter end portion (an example of "small-diameter portion") of a flaring changing region 9 in a flared portion 3A of the tube 3, the flared portion being externally fitted to the inner cylinder portion 4; a slipping-off prevention peripheral edge (an example of a slipping-off prevention pressing portion) 11 which is actable on a large-diameter end portion (an example of "large-diameter portion") of the flaring changing region 9; a pressing inner peripheral portion 13 which is externally fittable to a flared straight portion 12 of the flared portion 3A, the flared straight portion surrounding the constant-diameter straight barrel cylinder portion 4B; and a guide cylinder portion 14 which surrounds the tube 3 over a predetermined length in the direction of the axis P in succession to the seal peripheral edge 10.

In the seal peripheral edge 10, the inner diameter is substantially equal to the outer diameter of the tube 3, and a pressing face 10a is formed as a side peripheral face which is perpendicular to the axis P. In the slipping-off prevention peripheral edge 11, the diameter of the inner peripheral face is set to a value which is larger than the diameter of the outer peripheral face 4b of the straight barrel cylinder portion 4B which has the maximum diameter in the inner cylinder portion 4, and smaller than the diameter of the pressing inner peripheral portion 13 that is substantially equal or equal to a diameter that is obtained by adding the thickness of the tube 3 (it is set to a state in which the slipping-off prevention peripheral edge 11 acts on the large-diameter end portion of the flaring changing region 9). Alternatively, it is not limited to this (for example, the diameter is smaller than that of the outer peripheral face 4b). Also a pressing face 11a of the slipping-off prevention peripheral edge 11 is a side peripheral face which is perpendicular to the axis P.

The pressing inner peripheral portion 13 is set to a value at which it is press-inserted (pressingly contacted with and externally fitted) to the flared straight portion 12 in a degree in which a radial gap is not formed between the pressing inner peripheral portion and the flared straight portion 12, and co-rotation of the flared portion 3A due to fastening of the union nut 2 does not occur, and slipping-off preventing means N is configured. This is conducted in order that the fastening of the union nut 2 causes the slipping-off prevention peripheral edge 11 to press the flared straight portion 12 so as to bite in the axial direction in order to block slipping off of the tube 3, and relief deformation in which the flared straight portion 12 is radially outward expanded is prevented from occurring by the pressing force, thereby obtaining the enhanced resistance against pulling due to cooperation with the slipping-off prevention pressing portion 11. The diameter of the pressing inner peripheral portion 13 may be set so that a radial gap is not formed or substantially not formed between the pressing inner peripheral portion and the flared straight portion 12. This is conducted in order that the fastening of the union nut 2 causes the slipping-off prevention peripheral edge 11 to press the flared straight portion 12 in the axial direction, so that deformation in which the flared straight portion 12 is radially outward expanded is not caused or substantially not caused, thereby obtaining an effective resistance against pulling.

Next, the end portion of the tube 3 is externally fitted and inserted into the inner cylinder portion 4 by forcibly pushing the tube 3 at normal temperature to be attached while being flared, by heating the tube with using a heating source so as to be easily expandingly deformed and then pushing it, or by previously flaring the tube end with using a flaring machine (not shown) and then pushing it into the inner cylinder portion 4, so that the tube is inserted until the tube end butts against the side peripheral wall 15 as shown in FIG. 1. Therefore, the flared portion 3A which is the tube end is formed by: the flaring changing region 9 which is externally fitted to the outer peripheral face 4a of the end-tapered cylinder portion 4A; the flared straight portion 12 which is externally fitted to the outer peripheral face 4b of the straight barrel cylinder portion 4B; a diameter-reduction changing region 18 which is externally fitted to the outer peripheral face 4d of the end-expanded cylinder portion 4D; and a squeezed straight portion 19 which is externally fitted to the outer peripheral face 4c of the small-diameter straight barrel cylinder portion 4C.

As shown in FIGS. 1 and 2, namely, it is set so that, by a screw advancement in the direction of the axis P of the joint body 1, the screw advancement being caused by the fastening of the union nut 2 due to screwing of the internal thread portion 8 to the external thread portion 5 in a state where the tube 3 is externally fitted and attached to the inner cylinder portion 4, the pressing inner peripheral portion 13 is externally fitted to the flared straight portion 12, a portion of the large-diameter portion of the flaring changing region 9 is pressed in the direction of the axis P by the slipping-off prevention pressing portion 11, the diameter of the portion being larger than that of the inner cylinder portion 4, and the small-diameter portion of the flaring changing region 9 is pressed in the direction of the axis P by the seal peripheral edge 10. The diameter of a fluid transfer path 3W of the tube 3, and that of the fluid path 7 are set to be equal to each other in order to attain a smooth fluid flow. Alternatively, the diameters may be different from each other.

In this case, as described above, the state is formed where a gap is not formed or substantially not formed in a radial direction between the pressing inner peripheral portion 13 and the flared straight portion 12. In Embodiment 1, the flaring changing region 9 of the tube 3 is formed as a portion which is put over the end-tapered cylinder portion 4A. The flaring changing region 9 is in a state of a tapered pipe which is gradually flared, and the seal peripheral edge 10 and the slipping-off prevention peripheral edge 11 are in positional relationships in which they are separated from each other in the direction of the axis P. As the angle formed by the outer peripheral face 4a of the end-tapered cylinder portion 4A and the axis P is steeper, the distance between the seal peripheral edge 10 and the slipping-off prevention peripheral edge 11 in the direction of the axis P is shorter. The seal peripheral edge 10 and the tip end of the inner cylinder portion 4 are slightly separated from each other in the direction of the axis P (see FIG. 2 and the like). When the angle of the outer peripheral face 4a is steep, the separation distance is increased, and, when the angle is gentle, the separation distance is decreased.

As shown in FIGS. 1 and 2, in the predetermined assembled state of the resin pipe joint A, the seal peripheral edge 10 presses the small-diameter portion of the flaring changing region 9 of the tube 3 in the direction of the axis P, and hence the end of the small-diameter side of the outer peripheral face 4a of the flaring changing region 9, and the inner peripheral face of the tube 3 adjoining the place are strongly pressingly contacted, and a sealing portion S is formed. The sealing portion S in the tip end place of the inner cylinder portion 4 enables the tube 3 and the joint body 1 to be satisfactorily sealed without causing a fluid such as a washing solution or a medical solution to enter between the inner cylinder portion 4 and the flared portion 3A.

The flared straight portion 12 of the flared portion 3A which is pressingly externally fitted to the inner cylinder portion 4 is surrounded by the outer peripheral face 4b of the straight barrel cylinder portion 4B and the pressing inner peripheral portion 13, and held so as not to be expandingly deformed, and the slipping-off prevention peripheral edge 11 is positioned so as to substantially bite the flared straight portion 12. This can resist a pulling force which is acted on the flared portion 3A by engagement of the slipping-off prevention peripheral edge 11 which presses the flared straight portion 12 so as to bite the large-diameter portion of the flaring changing region 9, i.e., substantially the flared straight portion 12, and can brake and block a sliding movement of the flared portion 3A in the slipping-off direction due to that the flared straight portion 12 can be expandingly deformed by the pulling force while using the slipping-off prevention peripheral edge 11 as the basing point. Even when the flared portion 3A is slightly slidingly moved in the direction of the axis P, also the seal point in the sealing portion S is shifted, and there is a possibility that the sealing function becomes uncertain. This can be prevented from occurring. Therefore, the slipping-off preventing means N for strongly regulating a movement in the direction of the axis P and in the direction along which the flared portion 3A slips off from the inner cylinder portion 4 is configured, thereby realizing an excellent resistance against pulling. As a result, the flare type resin pipe joint A configured by the joint body 1 and the union nut 2 is realized as an improved configuration which can be simply assembled by a nut operation in a state where the tube is attached to the inner cylinder portion, thereby attaining an excellent assembling property, and both the excellent sealing property due to the sealing portion S, and the high resistance against pulling due to the slipping-off preventing means N can be attained.

[Embodiment 2]

As shown in FIGS. 3 and 4, a resin pipe joint A of Embodiment 2 is identical with the resin pipe joint A of Embodiment 1 except that the inner cylinder portion 4 has a straight shape. Description of the same places is deemed to be performed by denoting the places by the identical reference numerals. The inner cylinder portion 4 of the joint body 1 has a shape which is configured by the end-tapered cylinder portion 4A and a straight cylinder portion 4E, and which does not have a squeezed portion. The flared portion 3A which is externally fitted and attached to there is configured by the flaring changing region 9 and a flared long-straight portion 20.

In the joint body 1 in Embodiment 2, namely, the straight barrel cylinder portion 4B, end-expanded cylinder portion 4D, and small-diameter straight barrel cylinder portion 4C of the joint body 1 in Embodiment 1 are replaced with the straight cylinder portion 4E. In the flared portion 3A in Embodiment 2, the flared straight portion 12, diameter-reduction changing region 18, and squeezed straight portion 19 of the flared portion 3A in Embodiment 1 are replaced with the flared long-straight portion 20. In other words, the straight cylinder portion 4E in Embodiment 2 has a configuration in which the straight barrel cylinder portion 4B in Embodiment 1 is extended to the end of the inner cylinder portion 4, the end being opposite to the end-tapered cylinder portion 4A. The flared long-straight portion 20 in Embodiment 2 has a configuration in which the flared straight portion 12 in Embodiment 1 is extended to the side peripheral wall 15.

When the resin pipe joints A of Embodiments 1 and 2 are compared with each other, the joint of Embodiment 1 having the inner cylinder portion 4 in which the axial direction sectional shape exhibits a mountain-like shape is more excellent in the resistance against pulling of the tube 3, but has a disadvantage that the diameter of the inner region of the inner cylinder portion 4 is reduced and hence the working is difficult. From the viewpoint of easiness of working, the joint of Embodiment 2 having the inner cylinder portion 4 in which the axial direction sectional shape is a substantially straight shape is more excellent. Therefore, the joints may be adequately selected and set in consideration of their advantages and disadvantages.

[Other Embodiments]

In the slipping-off preventing means N in Embodiments 1 and 2, the diameter of the pressing inner peripheral portion 13 may be set so that a radial gap is not formed or substantially not formed between the pressing inner peripheral portion and the flared straight portion 12. Also in this configuration, the slipping-off preventing means N for regulating so that the fastening of the union nut 2 causes the slipping-off prevention peripheral edge 11 to press the flared straight portion 12 in the axial direction, whereby deformation in which the flared straight portion 12 is radially outward expanded is not caused or substantially not caused is configured, and an effective resistance against pulling can be obtained.

The seal pressing portion 10 and the slipping-off prevention pressing portion 11 may be configured by intermittent peripheral edges which are formed by division into a plurality of peripheral portions, or the angle of the edge portion in a sectional shape may be an angle which is other than 90 deg. (right angle) shown in FIG. 2 and the like, such as 80 deg. or 100 deg. The outer peripheral face 4b of the straight barrel cylinder portion 4B, and the pressing inner peripheral portion 13 are parallel to each other. Alternatively, a small relative angle may be formed as far as in the range where radial outward expanding deformation of the flared straight portion 12 by the pressing force of the slipping-off prevention pressing portion 11 does not occur.

As the synthetic resin, various resins such as PEEK (polyether ether ketone) and PP (polypropylene) may be used in addition to a fluorine resin. As a fluorine resin, various resins such as PTFE, PFA, PVDF, and ETFE may be useful.

Description of Reference Numerals 1 joint body
2 union nut
3 tube
3A flared portion
4 inner cylinder portion
4A end-tapered cylinder portion
4B straight barrel cylinder portion
4C small-diameter straight barrel cylinder portion
5 external thread portion
8 internal thread portion
9 flaring changing region
10 seal edge
11 slipping-off prevention edge
12 flared straight portion
13 pressing inner peripheral portion
P axis

The invention claimed is:

1. A resin pipe joint wherein said resin pipe joint has:
   a synthetic resin-made joint body including an inner cylinder portion to which an end portion of a synthetic resin-made tube is externally fittable and attachable while being flared, and an external thread portion; and
   a synthetic resin-made union nut including: an internal thread portion which is screwable with said external thread portion; a seal pressing portion which is actable on a small-diameter portion of a flaring changing region in a flared portion of said tube, said flared portion being externally fitted to said inner cylinder portion; a slipping-off prevention pressing portion which is actable on a large-diameter portion of said flaring changing region; and a pressing inner peripheral portion which is externally fittable to a flared straight portion of said flared portion, said flared straight portion surrounding a constant-diameter straight barrel cylinder portion, and
   said resin pipe joint is set so that, by a screw advancement of said union nut in a direction of an axis of sad joint body, the screw advancement being caused by screwing said internal thread portion to said external thread portion in a state where said tube is externally fitted and attached to said inner cylinder portion and said flared portion is formed, said pressing inner peripheral portion is externally fitted to said flared straight portion, a portion of said large-diameter portion of said flaring changing region is pressed in the direction of the axis by said slipping-off prevention pressing portion, a diameter of said portion being larger than a diameter of said inner cylinder portion, and said small-diameter portion of said flaring changing region is pressed in the direction of the axis by said seal pressing portion, and
   a pressing face is formed on the slipping-off prevention pressing portion, an inner diameter of the pressing face is formed to be larger than a maximum diameter of an outer peripheral face of the inner cylinder portion and smaller than a diameter of an inner peripheral face of the pressing inner peripheral portion, the pressing face being perpendicular to the axis.

2. A resin pipe joint according to claim 1, wherein said inner cylinder portion is formed by an end-tapered cylinder portion which causes said tube to be gradually flared, and said straight barrel cylinder portion which is formed in succession to a large-diameter side of said end-tapered cylinder portion, and said flaring changing region of said tube is a portion which is put over said end-tapered cylinder portion.

3. A resin pipe joint according to claim 2, wherein said straight barrel cylinder portion is extended to an end of said inner cylinder portion, said end being opposite to said end-tapered cylinder portion.

4. A resin pipe joint according to claim 3, wherein both said joint body and said union nut are made of a fluorine resin.

5. A resin pipe joint according to claim 2, wherein said inner cylinder portion has a small-diameter straight barrel cylinder portion which is formed in a side of said straight barrel cylinder portion in a state where a diameter is smaller than said straight barrel cylinder portion, said side being opposite to said end-tapered cylinder portion.

6. A resin pipe joint according to claim 5, wherein both said joint body and said union nut are made of a fluorine resin.

7. A resin pipe joint according to claim 1, wherein both said joint body and said union nut are made of a fluorine resin.

8. A resin pipe joint according to claim 2, wherein both said joint body and said union nut are made of a fluorine resin.

9. A resin pipe joint wherein said resin pipe joint has:
a synthetic resin-made joint body including an inner cylinder portion to which an end portion of a synthetic resin-made tube is externally fittable and attachable while being flared, and an external thread portion; and
a synthetic resin-made union nut including: an internal thread portion which is screwable with said external thread portion; a seal pressing portion which is actable on a small-diameter portion of a flaring changing region in a flared portion of said tube, said flared portion being externally fitted to said inner cylinder portion; a slipping-off prevention pressing portion which is actable on a large-diameter portion of said flaring changing region; and a pressing inner peripheral portion which is externally fittable to a flared straight portion of said flared portion, said flared straight portion surrounding a constant-diameter straight barrel cylinder portion, and
said resin pipe joint is set so that, by a screw advancement of said union nut in a direction of an axis of said joint body, said screw advancement being caused by screwing said internal thread portion to said external thread portion in a state where said tube is externally fitted and attached to said inner cylinder portion and said flared portion is formed, said pressing inner peripheral portion is pressingly contacted with and externally fitted to said flared straight portion, said large-diameter portion of said flaring changing region is pressed in the direction of the axis by said slipping-off prevention pressing portion, and said small-diameter portion of said flaring changing region is pressed in the direction of the axis by said seal pressing portion, and
a pressing face is formed on the slipping-off prevention pressing portion, a an inner diameter of the pressing face is formed to be larger than a maximum diameter of an outer peripheral face of the inner cylinder portion and smaller than a diameter of an inner peripheral face of the pressing inner peripheral portion, the pressing face being perpendicular to the axis.

10. A resin pipe joint according to claim 9, wherein said pressing inner peripheral portion is pressingly contacted with and externally fitted to said flared straight portion in a degree in which a radial gap is not formed between said pressing inner peripheral portion and said flared straight portion, and co-rotation of said flared portion due to fastening of said union nut does not occur.

11. A resin pipe joint according to claim 10, wherein said inner cylinder portion is formed by an end-tapered cylinder portion which causes said tube to be gradually flared, and said straight barrel cylinder portion which is formed in succession to a large-diameter side of said end-tapered cylinder portion, and said flaring changing region of said tube is a portion which is put over said end-tapered cylinder portion.

12. A resin pipe joint according to claim 11, wherein said straight barrel cylinder portion is extended to an end of said inner cylinder portion, said end being opposite to said end-tapered cylinder portion.

13. A resin pipe joint according to claim 12, wherein both said joint body and said union nut are made of a fluorine resin.

14. A resin pipe joint according to claim 11, wherein both said joint body and said union nut are made of a fluorine resin.

15. A resin pipe joint according to claim 10, wherein both said joint body and said union nut are made of a fluorine resin.

16. A resin pipe joint according to claim 9, wherein said inner cylinder portion is formed by an end-tapered cylinder portion which causes said tube to be gradually flared, and said straight barrel cylinder portion which is formed in succession to a large-diameter side of said end-tapered cylinder portion, and said flaring changing region of said tube is a portion which is put over said end-tapered cylinder portion.

17. A resin pipe joint according to claim 16, wherein said straight barrel cylinder portion is extended to an end of said inner cylinder portion, said end being opposite to said end-tapered cylinder portion.

18. A resin pipe joint according to claim 17, wherein both said joint body and said union nut are made of a fluorine resin.

19. A resin pipe joint according to claim 16, wherein both said joint body and said union nut are made of a fluorine resin.

20. A resin pipe joint according to claim 9, wherein both said joint body and said union nut are made of a fluorine resin.

* * * * *